United States Patent [19]

Overstreet et al.

[11] Patent Number: 5,295,574
[45] Date of Patent: Mar. 22, 1994

[54] INFEED BOOT AND METHOD OF LOADING ARTICLES FOR A VACUUM CONVEYOR

[75] Inventors: Michael R. Overstreet, Rustburg; Quentin L. Wilson, Big Island; George H. Dawson, III, Lynchburg, all of Va.

[73] Assignee: Simplimatic Engineering Company, Lynchburg, Va.

[21] Appl. No.: 25,847

[22] Filed: Mar. 3, 1993

[51] Int. Cl.⁵ .......................................... B65G 17/46
[52] U.S. Cl. ................................ 198/689.1; 198/443
[58] Field of Search .................. 198/689.1, 471.1, 443, 198/550.13

[56] References Cited

U.S. PATENT DOCUMENTS

| | | | |
|---|---|---|---|
| 3,080,079 | 3/1963 | Lecrone et al. | 198/689.1 X |
| 3,285,387 | 11/1966 | Ochs | 198/689.1 X |
| 3,502,195 | 3/1970 | Benner | 198/689.1 X |
| 3,592,334 | 7/1971 | Fleischauer | 198/689.1 X |
| 3,722,665 | 3/1973 | Probasco | 198/689.1 |
| 3,963,235 | 6/1976 | Snellman et al. | 198/689.1 X |
| 4,006,812 | 2/1977 | Everett et al. | 198/689.1 |
| 4,530,632 | 7/1985 | Sela | 198/689.1 X |
| 4,768,643 | 9/1988 | Lenhart | 198/689.1 X |
| 4,773,522 | 9/1988 | Lenhart | 198/689.1 X |

Primary Examiner—James R. Bidwell

[57] ABSTRACT

An infeed boot is provided for loading articles on a vacuum conveyor comprising a vacuum conveyor belt, an article-retaining surface at least a portion of which is mounted adjacent the belt to form a loading zone, and a plurality of perforations in the article-retaining surface permitting air to be drawn into the loading zone to aid in loading articles.

22 Claims, 7 Drawing Sheets

INFEED BOOT AND METHOD OF LOADING ARTICLES FOR A VACUUM CONVEYOR

FIELD OF THE INVENTION

The invention relates to an infeed boot for a vacuum conveyor, and more specifically to an infeed boot having a perforated surface which reduces the flow of air in through the boot exit and which permits adjustment of the distribution of articles across the vacuum conveyor.

BACKGROUND OF THE INVENTION

Vacuum conveyor belts for holding articles by vacuum pressure and for moving articles between first and second positions are known in the art and include a variety of features for conveying different types of articles.

U.S. Pat. Nos. 3,080.079 (Lecrone) and 4,773,522 (Lenhart) disclose overhead vacuum belts for lifting articles off a conveyor. Lecrone includes means for aligning baking trays on the conveyor, and a transfer belt for receiving buns removed from the trays by the overhead vacuum belt. Lenhart includes a vacuum deadplate for accumulating and metering articles to the overhead vacuum belt in rows.

U.S. Pat. Nos. 4,530,632 (Sela) and 3,722,665 (Probasco) disclose vacuum conveyor belts for transferring a single file of articles up an incline. Sela includes a vacuum belt formed of open mesh and a air conveyor delivery chute. Probasco includes a spring-biased vent in the vacuum chamber to regulate vacuum force in accordance with the number of articles on the belt to assure initial pickup but prevent excessive force.

Figure 4:
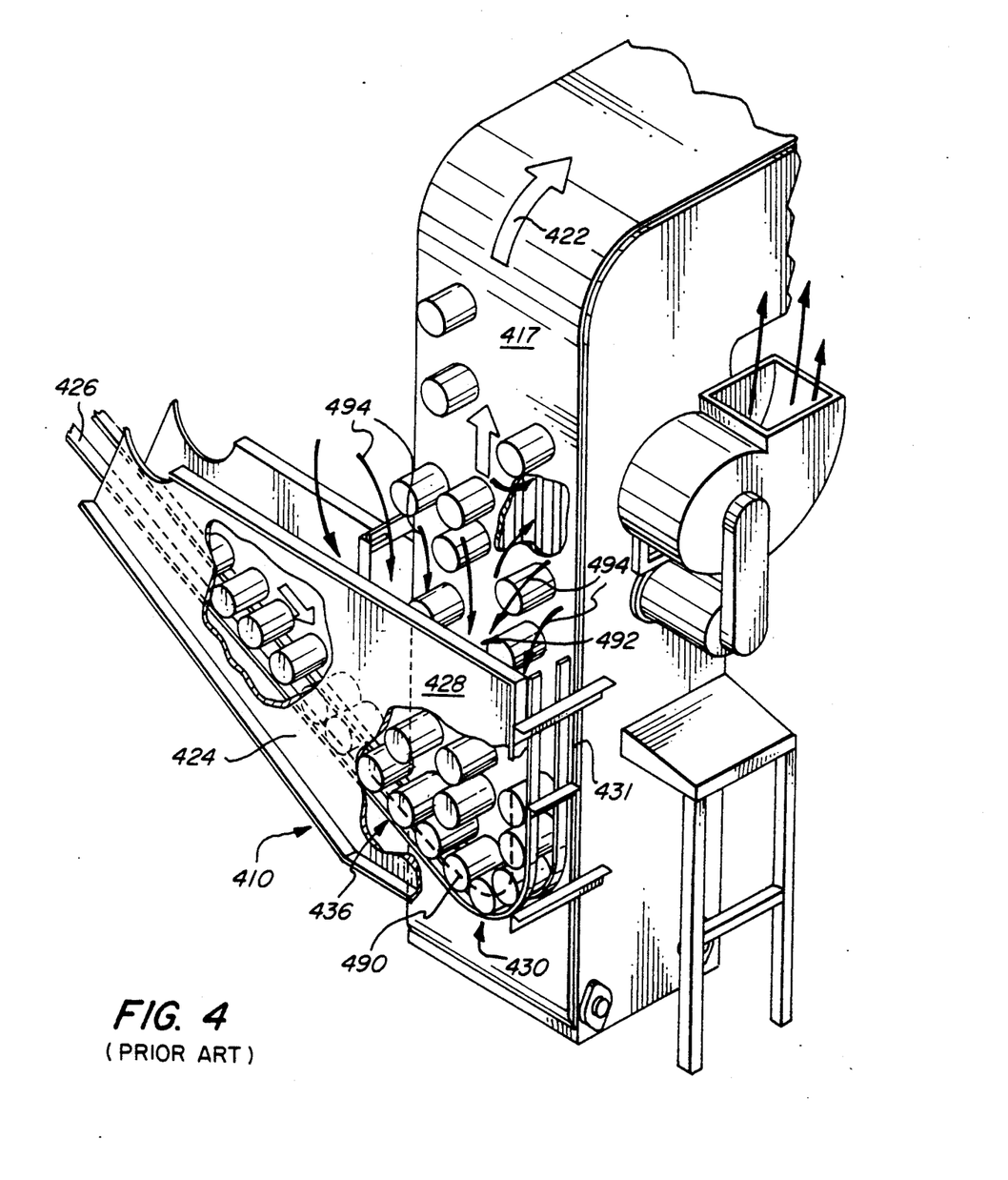
FIG. 4 is a front isometric view of a prior art infeed boot.

Infeed boots, such as that illustrated in FIG. 4, for loading vacuum conveyors are also known in the art. Prior art infeed boots include an article-retaining surface adjacent the vacuum elevator belt. This surface helps to prevent articles, which generally enter the boot on their sides, from tipping over. Tipped articles may be damaged and may also jam the boot.

A disadvantage of prior art infeed boots is that articles entering the boot wall-up along the entry guide effectively forming a secondary vacuum chamber in combination with the article retaining surface. The secondary vacuum chamber draws air in through its open side, i.e., its exit, in a direction opposite the vacuum conveyor belt conveying direction. This flow of air in through the boot exit may impede the passage of articles out through the boot exit and may require higher pressures to retain articles on the vacuum belt. Higher pressures, however, are likely to increase the air flow into the boot exit. Further, higher pressures may concentrate incoming articles on the edge of the vacuum belt nearest the boot entrance.

What is desired, therefore, is an infeed boot which reduces the flow of air in through the boot exit, and which permits adjustment of the distribution of articles across the vacuum conveyor.

SUMMARY OF THE INVENTION

Accordingly, it is an object of the invention to provide an infeed boot for a vacuum conveyor which is relatively simple in construction and is dependable in use.

Another object of the invention is to provide an infeed boot which reduces the flow of air in through the boot exit.

A further object of the invention is to provide an infeed boot which permits adjustment of the distribution of articles across the vacuum conveyor.

Yet another object of the invention is to provide an infeed boot of the above character having an article-retaining surface which includes a plurality of perforations.

Still another object of the invention is to provide an infeed boot of the above character wherein the article-retaining surface is divided into a plurality of zones having plates for independently adjusting the size of the perforations in the zone.

Other objects of the invention will be obvious and may in part appear hereinafter.

These and other objects are achieved by provision of an infeed boot for loading articles on a vacuum conveyor comprising a vacuum conveyor belt, an article-retaining surface at least a portion of which is mounted adjacent the belt to form a loading zone, and a plurality of perforations in the article-retaining surface permitting air to be drawn into the loading zone to aid in loading articles.

Preferably, the infeed boot includes a guide rail for guiding articles into the loading zone, and at least one plate adjustably mounted with respect to the article-retaining surface to restrict the flow of air through at least one of the perforations. The article-retaining surface is preferably divided into at least two areas in the region of the loading zone, each area most preferably having a different perforation density.

In another aspect, the invention relates to a method of loading articles on a vacuum conveyor belt comprising the steps of providing an article-retaining surface mounted adjacent the belt to form a loading zone, introducing articles into the loading zone, and drawing air through the article-retaining surface toward the vacuum conveyor belt to load articles. Preferably, the method includes the step of providing the article-retaining surface with a plurality of perforations, which most preferably have a particular pattern and/or particular perforation density.

The invention and its particular features will become more apparent from the following detailed description considered with reference to the accompanying drawings.

DETAILED DESCRIPTION OF THE INVENTION

Figure 2:
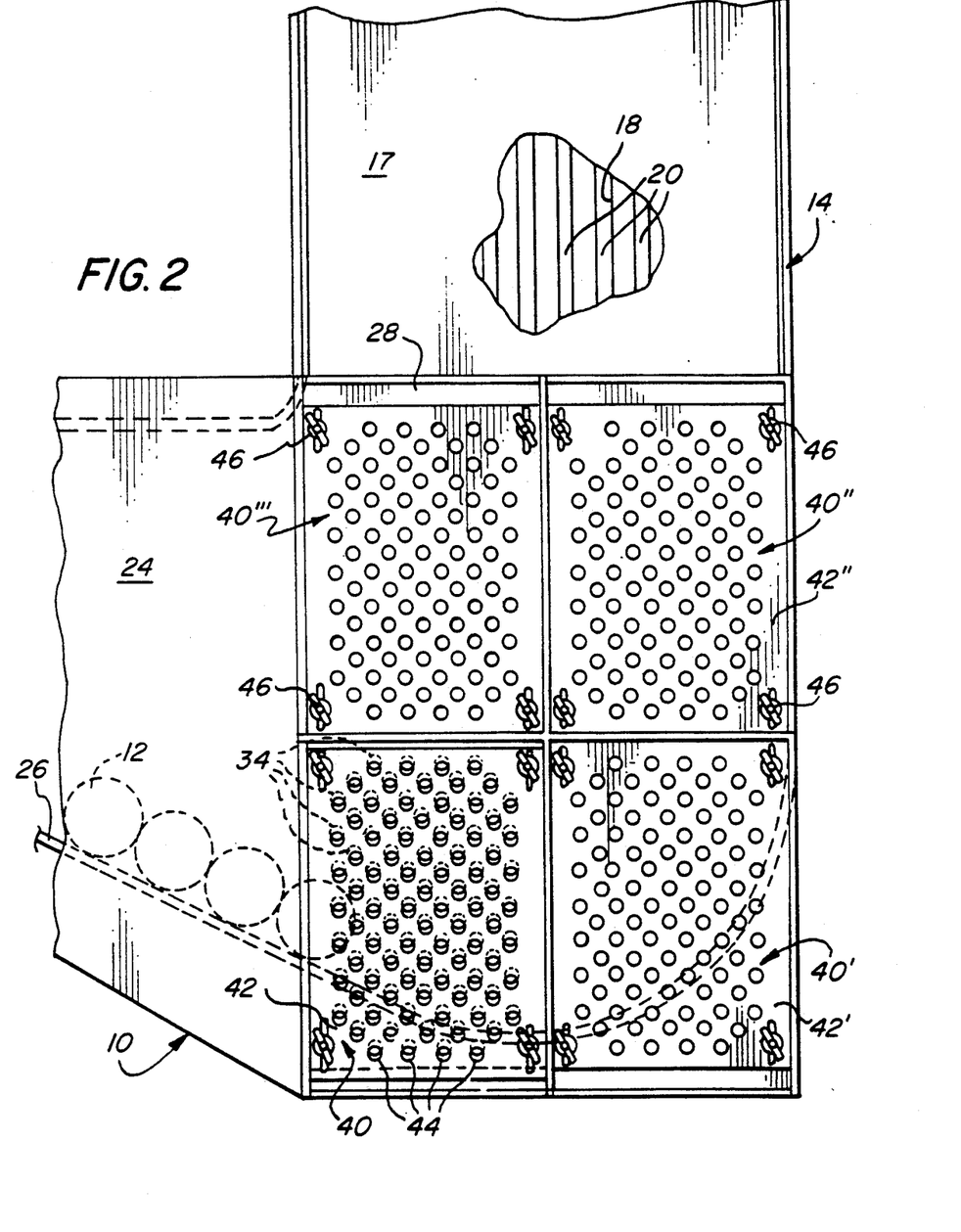
FIG. 2 is a front elevation view of the infeed boot of FIG. 1.
Figure 3A:
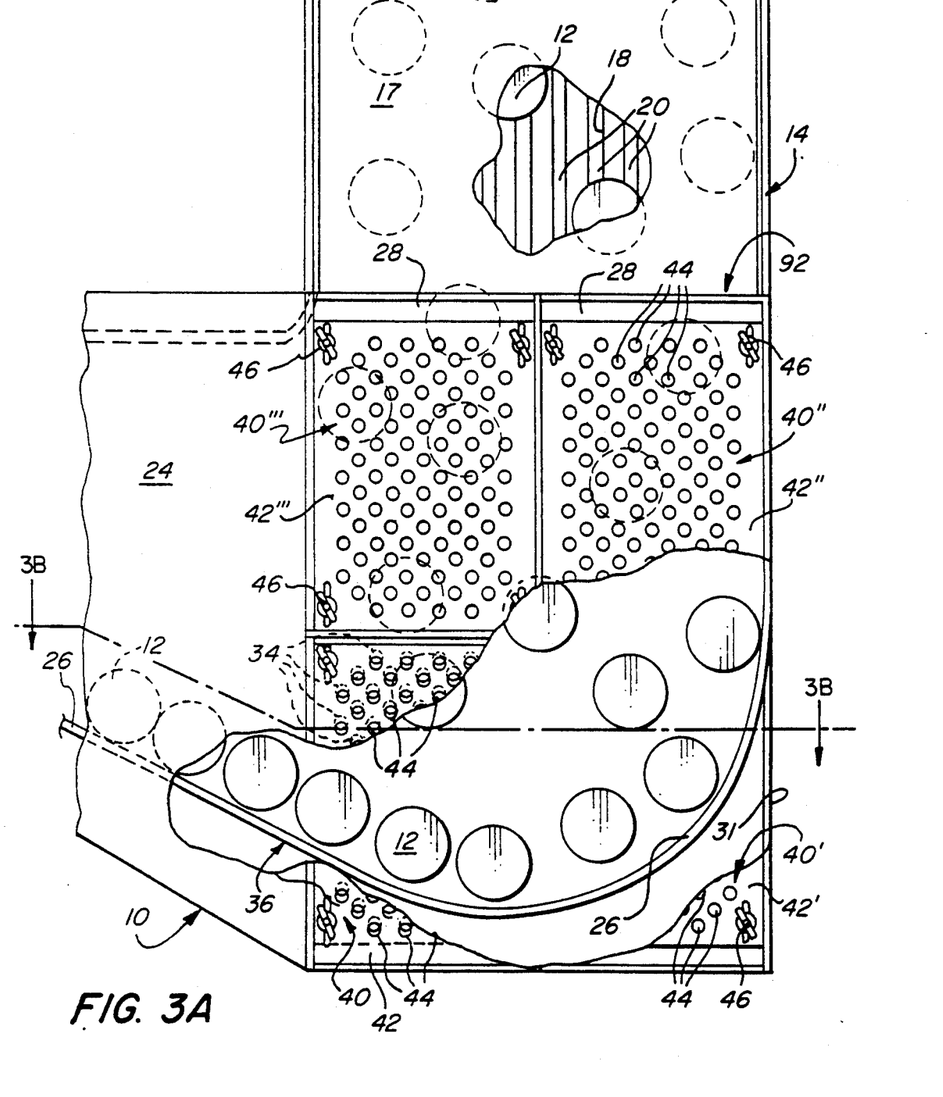
FIG. 3A is a front elevation view of the infeed boot of FIG. 1 partially broken away to depict the distribution of articles across the vacuum conveyor.
Figure 3B:
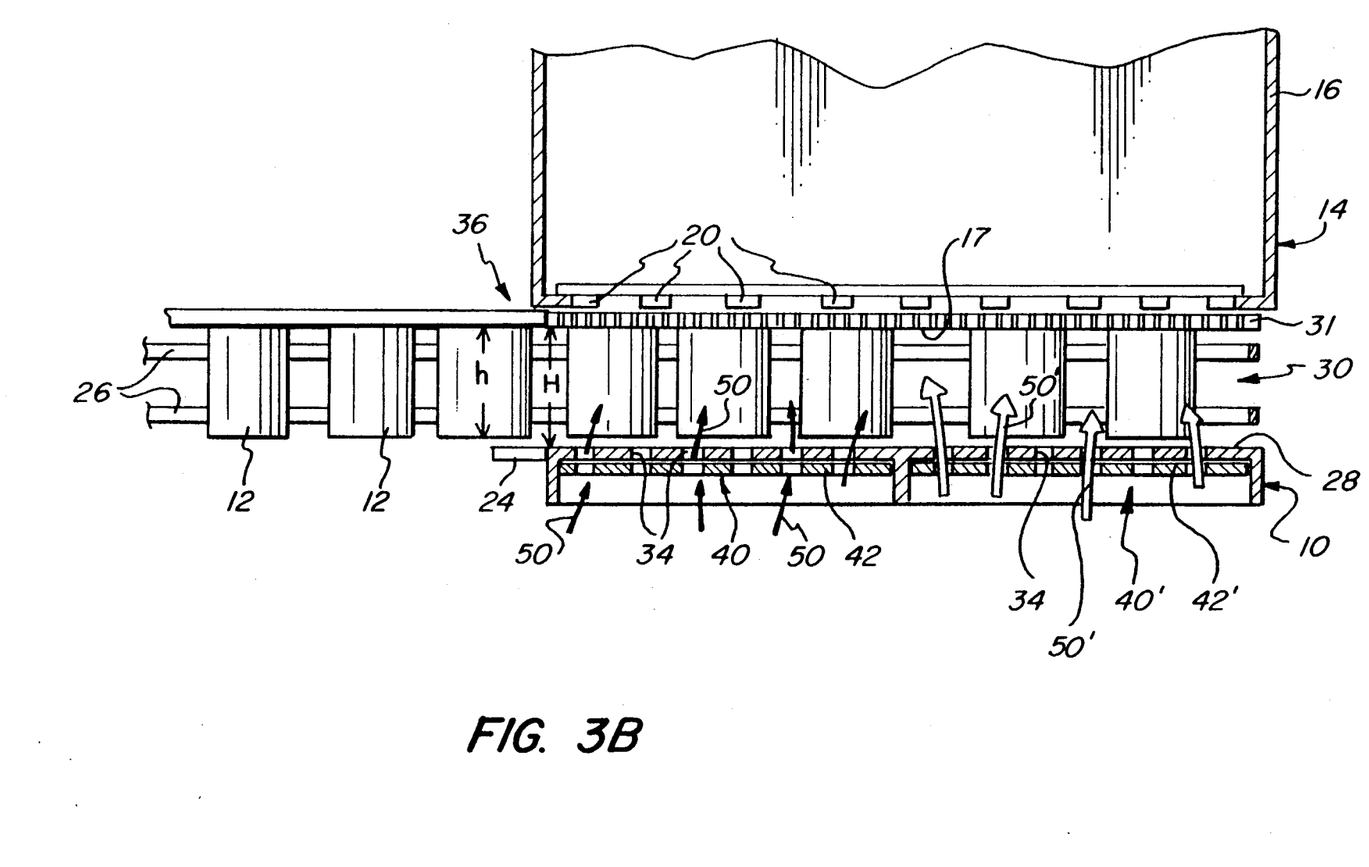
FIG. 3B is a cross-sectional view of the infeed boot of FIG. 1 depicting the function of the perforated article-retaining surface.

FIGS. 2, 3A and 3B depict an infeed boot 10 in accordance with the invention for loading articles 12 onto a vacuum elevator 14. In the use of vacuum elevator 14, articles 12 are most likely cans; it is understood, however, that other vacuum conveyors and different type articles may also be used.

Vacuum elevator 14 includes a vacuum chamber 16 and a vacuum conveyor belt 17. Vacuum chamber 16 has a side 18 with a plurality of spaced apart wearstrips 20 for supporting belt 17 while permitting drawing air into the vacuum chamber. It is understood that a perforated plate or the like may be used in place of wearstrips 20. Vacuum conveyor belt 17 is a porous, foraminous, air permeable or the like belt or web arranged to slide over side 18 of vacuum chamber 16 along a conveyor path indicated by arrow 22. In operation, suction from vacuum chamber 16 holds articles to conveyor belt 17 which circulates along path 22 to convey articles 12.

Figure 1:
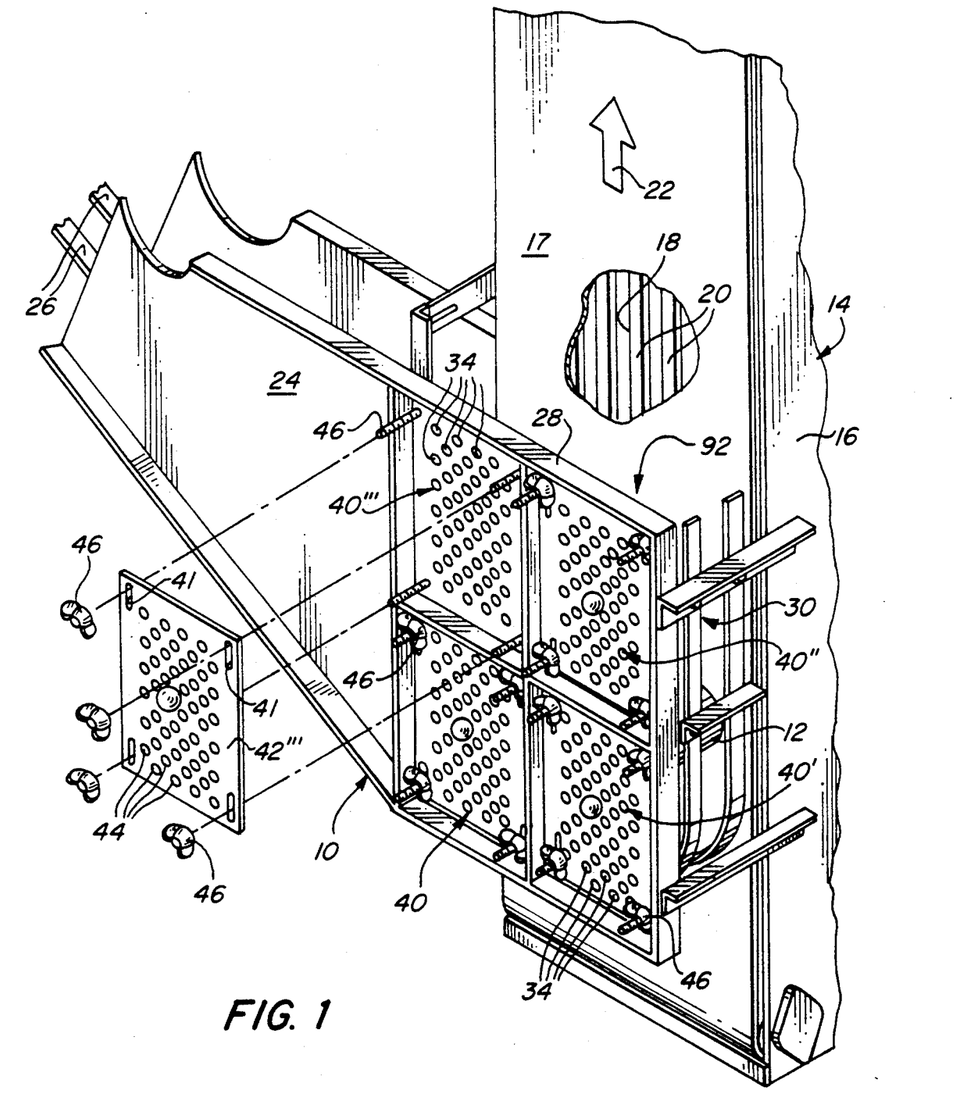
FIG. 1 is a front isometric view of an infeed boot in accordance with the invention.

Infeed boot 10 comprises an article-retaining surface 24 and an article introducing means such as guide rail 26. Surface 24 is mounted such that at least a portion 28 of the article-retaining surface is adjacent conveyor belt 17 to define an article loading zone 30 (see FIGS. 1 and 3B) therebetween. Guide rail 26 preferably introduces a single file of articles into loading zone 30. However, it is understood that a wide variety of upstream conveyor lines and systems capable of providing single file or bulk conveyance of articles may be used in place of guide rail 26 to supply articles to loading zone 30.

Article-retaining surface portion 28 is spaced apart from conveyor belt 17 a distance H which is generally only slightly larger than a dimension h of articles 12 (see FIG. 3B). H is greater than h by an amount permitting articles entering loading zone 30 to move across conveyor belt 17 toward edge 31 before being loaded or held to the belt by vacuum pressure. Yet, H is not so much greater than h that articles 12 may tip over as they move across conveyor belt 17. Such tipping may not only damage the articles, but also may jam infeed boot 10. Thus, article-retaining surface portion 28 permits article loading and distribution across conveyor belt 17 while substantially preventing article tipping.

Surface portion 28 includes a plurality of perforations 34 (see FIGS. 1, 2 and 3B) for drawing air into loading zone 30 in a direction substantially perpendicular to conveyor belt 17. As air is drawn through perforations 34 by vacuum chamber 16, it strikes articles 12 in such a way as to urge the articles toward conveyor belt 17 for loading. For example, where articles 12 are cans, air drawn through perforations 34 (indicated by arrows 50, 50' in FIG. 3B) strikes the bottoms of the articles, or fills the articles, and sweeps along the sides of the articles in a direction toward conveyor belt 17.

FIG. 4 depicts a prior art infeed boot 410 for loading cans onto a vacuum elevator belt 417. Infeed boot 410 includes an article-retaining surface 424 at least a portion 428 of which is mounted adjacent belt 417 to form a loading zone 430. Articles enter loading zone 430 at position 436 on guide rail 426 and tend to lie along guide rail 426 across belt 417 toward edge 431 to form a wall indicated by dashed line 490. Wall 490 in combination with article-retaining surface portion 428 forms loading zone 430 into a secondary vacuum chamber which draws air in through loading zone exit 492 as indicated by arrows 494 in a direction opposite conveyor path 422. Air flow 494 may disadvantageously impede the conveyance of articles out of infeed boot 410 and along path 422. Air flow 494 may also require higher vacuum pressures to retain articles in a held or loaded position on vacuum conveyor belt 417. However, higher vacuum pressures only increase air flow in through boot exit 492. Referring again to FIGS. 1, 2, 3A and 3B perforations 34 of infeed boot 10 prevent this disadvantageous air flow in through boot exit 92 even where articles do tend to form a wall along guide rail 26 within loading zone 30.

The density of perforations in article-retaining surface portion 28 or perforation density will determine the amount of article loading force applied to articles within the loading zone, i.e., the greater the perforation density the greater the article loading force that is applied.

By "perforation density" is meant the total area of perforations per unit area of article-retaining surface in the region of the loading zone. In this regard, the distribution of articles across conveyor belt 17 from position of introduction 36 of articles into loading zone 30 (see FIGS. 3A and 3B) toward edge 31 of conveyor belt 17 may be adjusted by altering the perforation density of article-retaining surface portion 28 between position 36 and edge 31. Perforation density may be altered by changing the number and/or the size of perforations in surface portion 28.

Figure 5:
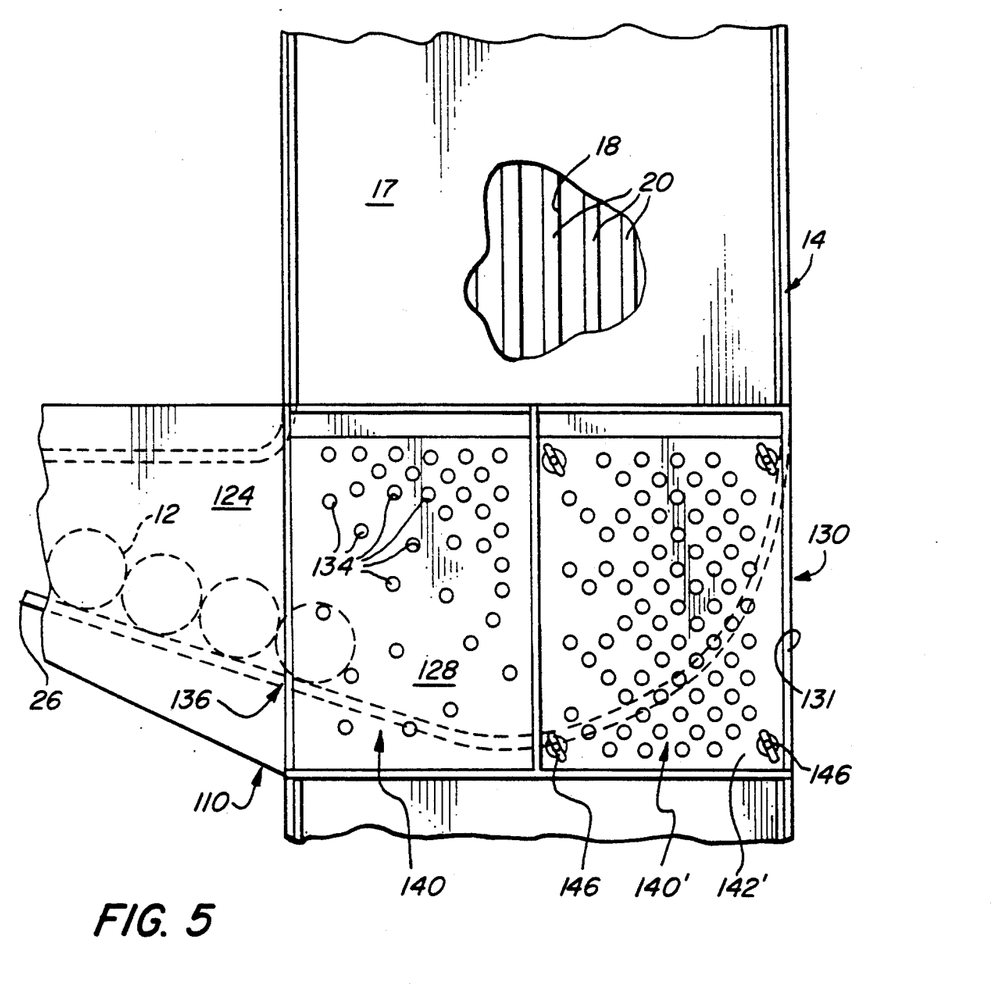
FIGS. 5 and 6 are front elevation views of alternative embodiments of the infeed boot of FIG. 1.

Referring to FIG. 5, an alternative embodiment 110 of the infeed boot illustrates altering perforation density by changing the number of perforations per unit area of article-retaining surface. Infeed boot 110 includes an article-retaining surface 124 having at least a portion 128 mounted adjacent vacuum conveyor belt 17 to form a loading zone 130. Article-retaining surface portion 128 includes a plurality of perforations 134 arranged with an increasing number of perforations per unit of area from position of introduction 136 of articles to loading zone 30 toward edge 131 of vacuum conveyor belt 17. This increasing number of perforations provides an increasing perforation density which permits adjustment of the pressure in vacuum chamber 16 to provide a sufficiently uniform distribution of articles while preventing the situation in which articles are predominantly loaded substantially immediately upon entering the loading zone.

Figure 6:
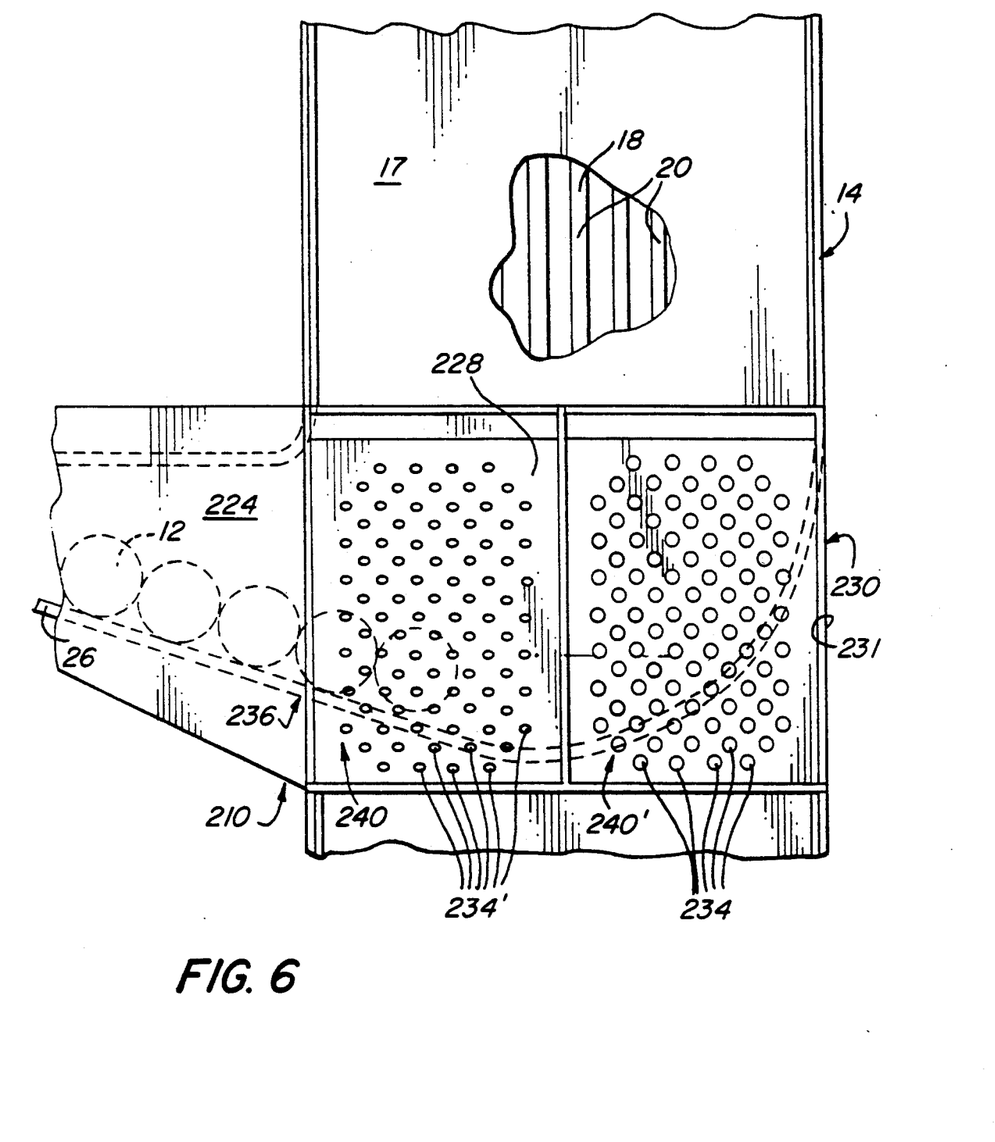

Referring to FIG. 6, an alternative embodiment 210 of the infeed boot illustrates altering perforation density by changing the size of perforations. Infeed boot 210 includes an article-retaining surface 224 having at least a portion 228 mounted adjacent vacuum conveyor belt 17 to form a loading zone 230. Article-retaining surface portion 228 includes a plurality of perforations 234 and 234' which have equivalent number densities but different perforation densities due to the fact that perforations 234' are smaller than perforations 234. The smaller perforations 234' are preferably located nearer point of introduction 236 of articles to loading zone 230 and the larger perforations 234 are located nearer edge 231 of vacuum conveyor belt 17 such that the perforation density increases in a direction from introduction point 236 toward conveyor belt edge 231. Again, the increasing perforation density moving away from introduction point 236 permits adjusting of vacuum chamber 16 pressure to provide a sufficiently uniform distribution of articles on belt 17. By providing a relatively lower article loading force nearer the article introduction point, the perforation density gradient encourages articles to move away from the introduction point prior to loading on the conveyor belt.

Infeed boots 110, 210 of FIGS. 5 and 6 are of limited flexibility because selection of the number of perforations per unit area across article-retaining surface portion 128 (FIG. 5), and the size of the perforations across article-retaining surface portion 228 (FIG. 6) is most conveniently done prior to assembly and operation of the infeed boot and thus the number and size of perforations may not easily and readily be adjusted.

Returning to FIGS. 1, 2, 3A and 3B, infeed boot 10 includes a perforated boot surface designed for relatively quick and easy changeover of perforation density permitting adjustment of the distribution of articles loaded onto vacuum conveyor belt 17. Article-retaining surface portion 28 is divided into at least two and preferably four areas 40, 40', 40'', 40''' including a pattern of perforations. A plate 42, 42', 42'', 42''' is provided for each area 40, 40', 40'', 40''' which includes holes 44 substantially matching said pattern of perforations in each of areas 40, 40', 40'', 40'''. Plates 42, 42', 42'', 42''' include mounting slots 41 (see FIG. 1) and are adjustably mounted to respective areas 40, 40', 40'', 40''' by bolt and wing nut combinations 46. Knobs 48 are also preferably connected to plates 42, 42', 42'', 42''' so that the plates can be relatively easily slidably adjusted to change the size of perforations 34 as illustrated for plate 42 (see FIGS. 2, 3A and 3B) and thereby to adjust the perforation density in area 40. Referring specifically to FIG. 3B, the position of plate 42 partially obstructing perforations 34 in area 40 is graphically depicted by comparing arrows 50 and 50'. Arrows 50 in area 40 are smaller than arrows 50' in area 40' in order to represent the smaller air flow in area 40 caused by the smaller perforation density in the area and yielding a smaller vacuum loading force.

Although areas 40, 40', 40'', 40''' are illustrated with identical patterns of same size holes, it is understood with reference to FIGS. 5 and 6 that the areas may be provided with different patterns and/or different sizes of holes, that plates may be provided to substantially match these different patterns and/or different sizes of holes, or that plates may be provided which do not substantially match an area's pattern of holes but which may be adjusted to alter the perforation density and thus the loading force within the loading zone in the region of the area.

Generally, plates 42, 42', 42'', 42''' are adjusted to provide a lower perforation density in area 40 nearest point of introduction 36 of articles 12 into loading zone 30 in order to encourage distribution of articles across belt 17 toward edge 31 prior to loading. Generally also, plates 42'' and 42''' are adjusted to provide the highest perforation density in areas 42'' and 42''' in order to minimize any flow of air in through loading zone exit 92 which may impede the flow of articles of out boot 10 along conveyor path 22. It is understood, however, that other perforation density gradients and arrangement are possible for loading different vacuum conveyor belt systems.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An infeed boot for loading articles on a vacuum conveyor comprising:
   a vacuum conveyor belt for holding articles thereagainst by vacuum pressure and for conveying the articles along a conveyor path;
   an article-retaining surface at least a portion of which is mounted adjacent said vacuum conveyor belt to define a loading zone therebetween, said article retaining surface spaced apart from said vacuum conveyor belt a distance sufficient to prevent articles introduced into the loading zone from tipping over as they are loaded onto said vacuum conveyor belt; and
   a plurality of perforations in said article retaining surface permitting air to be drawn into the loading zone in a direction substantially perpendicular to said vacuum conveyor belt to aid said vacuum conveyor belt in loading the articles.

2. The infeed boot of claim 1 wherein said article retaining surface is divided into at least two areas in the region of the loading zone, each area including a pattern of said perforations.

3. The infeed boot of claim 2 including two plates adjustably mounted to said article retaining surface, said plates including holes substantially matching said patterns of perforations in said article retaining surface areas.

4. The infeed boot of claim 3 wherein said article retaining surface is divided into four areas in the region of the loading zone, and including four plates mounted adjacent to said article retaining surface, said plates including holes substantially matching said patterns of perforations in said article retaining surface areas.

5. The infeed boot of claim 2 wherein said perforation patterns are substantially the same.

6. The infeed boot of claim 2 wherein a perforation density of said perforation patterns is different.

7. The infeed boot of claim 6 wherein said perforation density generally increases from the position at which articles are introduced into the loading zone toward an edge of said vacuum conveyor belt.

8. A infeed boot for loading articles on a vacuum conveyor comprising:
   a vacuum conveyor belt for holding articles thereagainst by vacuum pressure and for conveying the articles along a conveyor path;
   an article-retaining surface at least a portion of which is mounted adjacent said vacuum conveyor belt to define a loading zone therebetween;
   a guide rail, mounted between said vacuum conveyor belt and said article retaining surface, for guiding articles into the loading zone; and
   a plurality of perforations in said article retaining surface, whereby the flow of air into the loading zone in a direction opposite the conveyor path may be reduced.

9. The infeed boot of claim 8 wherein said article retaining surface is divided into at least two areas in the region of the loading zone, each area including a pattern of said perforations.

10. The infeed boot of claim 9 including two plates adjustably mounted to said article retaining surface, said plates including holes substantially matching said patterns of perforations in said article retaining surface areas.

11. The infeed boot of claim 10 wherein said article retaining surface is divided into four areas in the region of the loading zone, and including four plates mounted adjacent to said article retaining surface, said plates including holes substantially matching said patterns of perforations in said article retaining surface areas.

12. The infeed boot of claim 9 wherein said perforation patterns are substantially the same.

13. The infeed boot of claim 9 wherein a perforation density of said perforation patterns is different.

14. The infeed boot of claim 13 wherein said perforation density generally increases from the position at which said guide rail introduces articles into the loading zone toward an edge of said vacuum conveyor belt.

15. An infeed boot for loading articles on a vacuum conveyor comprising:
   a vacuum conveyor belt for holding articles thereagainst by vacuum pressure and for conveying the articles along a conveyor path;
   an article-retaining surface at least a portion of which is mounted adjacent said vacuum conveyor belt to define a loading zone therebetween,
   a plurality of perforations in said article retaining surface permitting air to be drawn into the loading zone; and
   at least one plate adjustably mounted with respect to said article-retaining surface to restrict the flow of air through at least one of said perforations, whereby the distribution of articles loaded onto said vacuum conveyor belt may be altered.

16. The infeed boot of claim 15 wherein said article retaining surface is divided into at least two areas in the region of the loading zone, each area including a pattern of said perforations.

17. The infeed boot of claim 16 wherein said perforation patterns are substantially the same.

18. The infeed boot of claim 16 wherein a perforation density of said perforation patterns is different.

19. The infeed boot of claim 18 wherein said perforation density generally increases from the position at which articles are introduced into the loading zone toward an edge of said vacuum conveyor belt.

20. A method of loading articles on a vacuum conveyor belt comprising the steps of:
   providing an article retaining surface at least a portion of which is mounted adjacent said vacuum conveyor belt to define a loading zone therebetween;
   providing a plurality of perforations in said article-retaining surface;
   introducing articles into the loading zone; and
   drawing air through said plurality of perforations in a direction substantially perpendicular to said vacuum conveyor belt to draw articles in the perpendicular direction for loading.

21. The method of claim 20 including the step, before drawing air, of at least partially blocking at least one of the perforations to alter the perforation density in a region of the loading zone.

22. The method of claim 20 wherein said perforation providing step comprises providing perforations with an increasing perforation density in a direction away from a position of introducing articles to the loading zone.

* * * * *